US005705778A

United States Patent [19]

Matsui et al.

[11] Patent Number: 5,705,778
[45] Date of Patent: Jan. 6, 1998

[54] ROTARY AND PUSHBUTTON SWITCH OPERATING MECHANISM INCLUDING FLEXIBLE CONNECTION ARRANGEMENT LOCATED BETWEEN ROTOR AND SHAFT

[75] Inventors: Hiroshi Matsui, Hirakata; Tamotsu Yamamoto, Ashiya; Hideki Shigemoto, Moriguchi, all of Japan

[73] Assignee: Matsushita Electric Industrial Co., Ltd., Kadoma, Japan

[21] Appl. No.: 568,026

[22] Filed: Dec. 6, 1995

[30] Foreign Application Priority Data

Dec. 14, 1994 [JP] Japan .................... 6-310403

[51] Int. Cl.$^6$ .................... H01H 3/00; F16D 3/00

[52] U.S. Cl. .................... 200/11 R; 200/11 G; 200/18; 464/185

[58] Field of Search .................... 200/4, 5 R, 6 R, 200/6 A, 11 R–11 TN, 14, 17 R, 18; 464/60; 74/5 F

[56] References Cited

U.S. PATENT DOCUMENTS

| | | | |
|---|---|---|---|
| 2,860,495 | 11/1958 | Stark | 464/87 |
| 3,030,460 | 4/1962 | Huetten et al. | 200/11 G |
| 3,543,301 | 11/1970 | Barnett | 74/5 F |
| 3,988,906 | 11/1976 | Smith | 464/88 |
| 4,363,018 | 12/1982 | Matsui et al. | 338/172 |
| 4,752,683 | 6/1988 | McGuire | 464/60 |
| 4,866,219 | 9/1989 | Riding et al. | 200/4 |
| 5,369,230 | 11/1994 | Misawa | 200/11 G X |
| 5,436,413 | 7/1995 | Katakami | 200/14 |

FOREIGN PATENT DOCUMENTS

| | | | |
|---|---|---|---|
| 0644402 | 3/1995 | European Pat. Off. . | |
| 2834070 | 2/1980 | Germany . | |
| 2910376 | 10/1980 | Germany . | |
| 4-52706 | 5/1992 | Japan | H01H 21/00 |
| 6-21208 | 6/1994 | Japan | H01C 10/36 |
| 469364 | 7/1937 | United Kingdom . | |

*Primary Examiner*—J. R. Scott
*Attorney, Agent, or Firm*—Renner, Otto, Boisselle, Sklar

[57] ABSTRACT

A rotary operation type electric device of the present invention includes: a rotary shaft; a rotary plate which is rotatable around the rotational axis; a connecting member for connecting the rotary shaft and the rotary plate, which retracts in an axial direction of the rotary shaft and does not retract in a rotary direction of the rotary plate; and an output terminal for outputting a signal in accordance with rotation of the rotary plate.

13 Claims, 16 Drawing Sheets

FIG. 9B
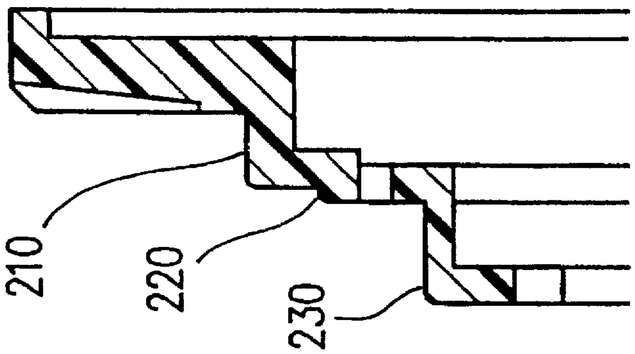
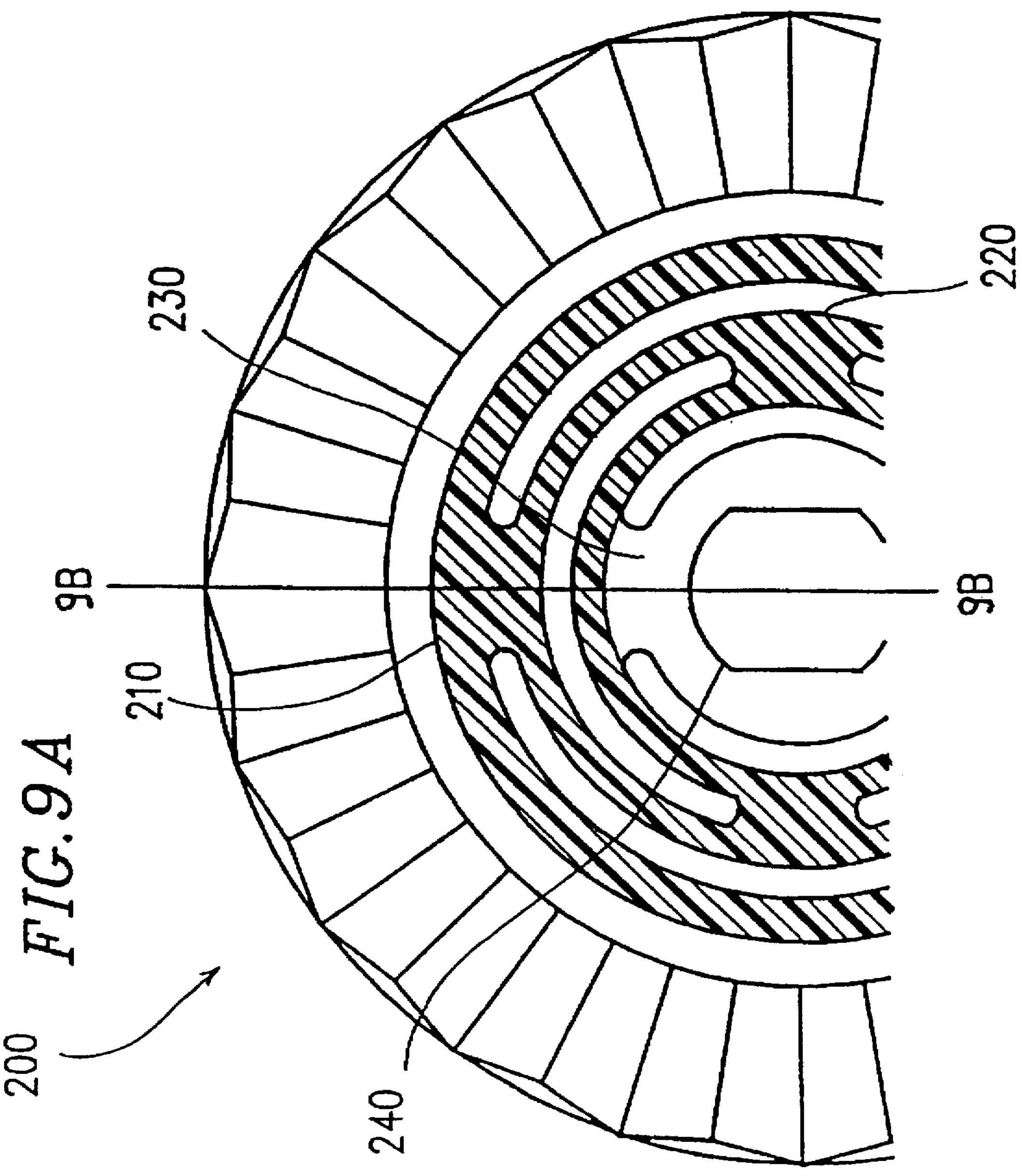
FIG. 9A

ROTARY AND PUSHBUTTON SWITCH OPERATING MECHANISM INCLUDING FLEXIBLE CONNECTION ARRANGEMENT LOCATED BETWEEN ROTOR AND SHAFT

BACKGROUND OF THE INVENTION

1. Field of the Invention

The present invention relates to a rotary operation type electronic device including a rotary operation section useful for adjusting volume, frequency, time, etc., in an audio apparatus or a video apparatus, for example; and a push switch section useful for switching a circuit. In particular, the present invention relates to a rotary operation type electronic device rotating about a rotational axis and vertically moving in an axial direction of the rotational axis.

2. Description of the Related Art

Hereinafter, a conventional rotary encoder having a push switch will be described with reference to FIGS. 1 to 4.

The rotary encoder shown in FIG. 1 includes: a rotary shaft 1 consisting of a metal bar having a head part 1*c*, a cylindrical part 1*d*, a lower non-circular part 1*a* and a bottom part 1*b*; and a rotary contact plate 3. The rotary shaft 1 rotates around a rotational axis 500. The rotational axis 500 passes through the center of the rotary shaft 1. The cylindrical part 1*d* is held by a bushing 2 so as to move vertically in the axial direction of the rotary shaft 1.

The lower non-circular part 1*a* of the rotary shaft 1 engages with a central non-circular opening 3*a* of the rotary contact plate 3 as shown in FIG. 4. Therefore, the rotation of the rotary shaft 1 is transmitted to the rotary contact plate 3. However, the vertical movement of the rotary shaft 1 in an axial direction is not transmitted to the rotary contact plate 3.

Referring again to FIG. 1, the rotary contact plate 3 is supported by a washer 4 so as not to slip off from the rotary shaft 1. On the bottom face 3 of the rotary contact plate 3, as shown in FIG. 2, a planer contact 5 consisting of a central circular portion 5*a* and a plurality of trapezoidal portions 5*b* extending from the central circular portion 5*a* in a radial manner is formed.

A fixed substrate 6 faces the planar contact 5 with a predetermined distance interposed therebetween. Three elastic legs 7*a*, 7*b* and 7*c* extend from the fixed substrate 6. Elastic tip contacts 8*a*, 8*b* and 8*c* of the respective elastic legs 7*a*, 7*b* and 7*c* are in contact with the central circular portion 5*a* or the trapezoidal portions 5*b* of the planar contact 5. The three elastic legs 7*a*, 7*b* and 7*c* respectively are connected to terminals 17*a*, 17*b* and 17*c*.

The contact 8*b*, the central point of the rotary contact plate 3 and the contact 8*c* are set so as to form an acute angle.

A metal fixture 9 is placed on the bottom face of the fixed substrate 6. By bending a lower end projection 11 of a metal cover 10 covering the rotary contact plate 3, the metal fixture 9 is fixed along with the fixed substrate 6. The metal fixture 9 has two legs 13*a* and 13*b*. In order to fix the rotary encoder shown in FIG. 1 to a printed wiring substrate 12 of an apparatus, the two legs 13*a* and 13*b* are fixed to the printed wiring substrate 12 by soldering.

A push switch 14 is placed directly below the rotary shaft 1 and between the legs 13*a* and 13*b*. A button 15 is in contact with the bottom part 1*b* of the rotary shaft 1.

Hereinafter, the operation of the conventional rotary encoder with a push switch will be described.

When a user turns a control 16 attached to the head part 1*c* of the rotary shaft 1, the rotary contact plate 3 rotates with the rotation of the rotary shaft 1. By the rotation of the rotary contact plate 3, the three elastic contacts 8*a*, 8*b* and 8*c* slide on the central circular portion 5*a* and the trapezoidal portions 5*b*. When a DC current flows across a terminal 17*a* while the rotary contact plate 3 is rotating, pulse signals are output from terminals 17*b* and 17*c*.

Since the positions of the elastic contacts 8*b* and 8*c* in contact with the trapezoidal portions 5*b* of the planar contact 5 are different, the pulse signals output to the terminals 17*b* and 17*c* are different from each other. The rotary encoder detects the amount of rotation and/or a rotation speed of the rotary shaft 1 based on the difference between pulse signals. By this operation, an apparatus using the rotary encoder can adjust the functions of the apparatus, such as volume, based on the rotation of the encoder.

The rotary shaft 1 does not move in an axial direction during rotary operation. Therefore, the user cannot operate the push switch 14.

When the rotary shaft 1 and the washer 4 are moved axially downward by pushing the control 16 in a direction indicated with an arrow as shown in FIG. 3, the bottom part 1*b* pushes the button 15 of the push switch 14. By this operation, the user can operate the push switch 14. In the case where the push switch 14 is pushed by the bottom part 1*b*, the rotary contact plate 3 of the encoder remains in the same place in which the rotary contact plate 3 has positioned before pushing the control 16.

As shown in FIGS. 4 and 5, since the conventional rotary encoder with a push switch has such a configuration that movement in an axial direction for pushing the push switch 14 is not transmitted to the rotary contact plate 3, the lower non-circular portion 1*a* of the rotary shaft 1 engages with the central non-circular opening 3*a* of the rotary contact plate 3 with a slight distance L therebetween.

The slight distance L results in some play in the engagement of the rotary shaft 1 with the rotary contact plate 3. This prevents the rotary contact plate 3 from rotating even if the rotary shaft 1 rotates. In other words, the rotary contact plate 3 does not rotate immediately when the rotary shaft 1 initiates to rotate, i.e., a time lag is generated.

In particular, when the rotary shaft 1 is rotated in a direction opposite to the actual rotary direction of the rotational axis 500 while the rotary shaft 1 is being rotated, there arises a problem that a user that rotates the rotary shaft 1 in the opposite direction will feel "backlash" or "slop" via a hand of the user. The reason for this is as follows: even if a space between the lower non-circular portion 1*a* and the central non-circular opening 3*a* of the rotary contact plate 3 is very small, the space is amplified due to a large diameter of the control 16.

Furthermore, in the case where an apparatus including the rotary encoder with a push switch is jolted, for example, when the apparatus is placed in a car, the above-mentioned rotary encoder with the push switch generates clatter or noise from the rotary encoder due to the above space. Therefore, the rotary encoder with the push switch is disadvantageous for using as a part of an audio system in a car.

SUMMARY OF THE INVENTION

The rotary operation type electric device of this invention, includes:

a rotary shaft;

a rotary plate which is rotatable around the rotational axis;

connection means for connecting the rotary shaft and the rotary plate, which retracts in an axial direction of the rotary shaft and does not retract in a rotary direction of the rotary plate; and output means for outputting a signal in accordance with rotation of the rotary plate.

In one embodiment of the present invention, a rotary operation type electronic device further includes bushing means having an inner hole into which the rotary shaft is inserted, which allows the rotary shaft to rotate and to move in the axial direction.

In another embodiment of the present invention, the rotary plate has a donut-like shape including an inner circumference and an outer circumference, and the connection means is connected along the inner circumference of the rotary plate having the donut-like shape.

In still another embodiment of the present invention, the connection means has a plurality of rings and a plurality of connecting portions for connecting adjacent rings, and the plurality of rings are placed on concentric circles having respectively different radiuses.

In still another embodiment of the present invention, the connection means has a plurality of members which are convexly bendable in the axial direction, each of the plurality of bendable members have an end connected to the rotary plate and the other end connected to the rotary shaft.

In still another embodiment of the present invention, each of the bendable members has a rib in a tangential direction of the rotary shaft.

In still another embodiment of the present invention, the connection means is integrally formed with the rotary plate.

In still another embodiment of the present invention, the connection means and the rotary plate are made of resin.

In still another embodiment of the present invention, a rotary operation type electronic device further includes a push switch which is switched between ON and OFF in response to movement of the rotary shaft in the axial direction.

In still another embodiment of the present invention, a rotary operation type electronic device further includes a push switch which is positioned on the rotary shaft and is switched between ON and OFF in response to movement of the rotary shaft in a direction in which the push switch is positioned.

In still another embodiment of the invention, the connection means has a plurality of rings each being connected to adjacent rings, and the connection means has a gimbal structure.

A rotary shaft of a rotary operation type electronic device according to the present invention is connected with a rotary contact plate through a connecting member which is elastic only in an axial direction. Therefore, if the rotary shaft rotates, the rotary contact plate also rotates without fail. The relationship between the rotation of the rotary shaft and the rotation of the rotary contact plate is linear. A conventional device may exhibit an amount X of play, i.e., the amount which the rotary contact plate fails to rotate even when the rotary shaft rotates by an amount X. Therefore, in the conventional device, a rotary contact plate will not reflect an amount X of rotation of the rotary. On the other hand, in the device according to the present invention, the rotary contact plate precisely reflects the amount of the rotation of the rotary shaft.

In the present invention, even when the rotary-shaft is rotated in a direction opposite to the rotary direction in which the rotary shaft is rotating, a user who rotates the rotary shaft in the opposite direction does not feel backlash in the device.

An audio apparatus including the rotary operation type electronic device according to the present invention is placed in a car the rotary operation type electronic device according to the present invention does not generate clatter. Therefore, a user can comfortably listen to music using the audio apparatus. A device according to the present invention does not have the amount of play. Therefore, the device can detect a small amount of play.

Thus, the invention described herein makes possible the advantage of providing a rotary operation type electronic device capable of detecting the amount of play and preventing the generation of clatter, and therefore, can be used as a part of an audio apparatus.

This and other advantages of the present invention will become apparent to those skilled in the art upon reading and understanding the following detailed description with reference to the accompanying figures.

BRIEF DESCRIPTION OF THE DRAWINGS

FIG. 9A and 9B show an example of a connecting member of a rotary operation type electronic device according to the present invention.

DESCRIPTION OF THE PREFERRED EMBODIMENTS

Examples of the present invention will be described with reference to illustrative drawings.

Example 1

Hereinafter, a first example of a rotary operation type electronic device according to the present invention will be described with reference to FIGS. 6 and 7.

Figure 1:
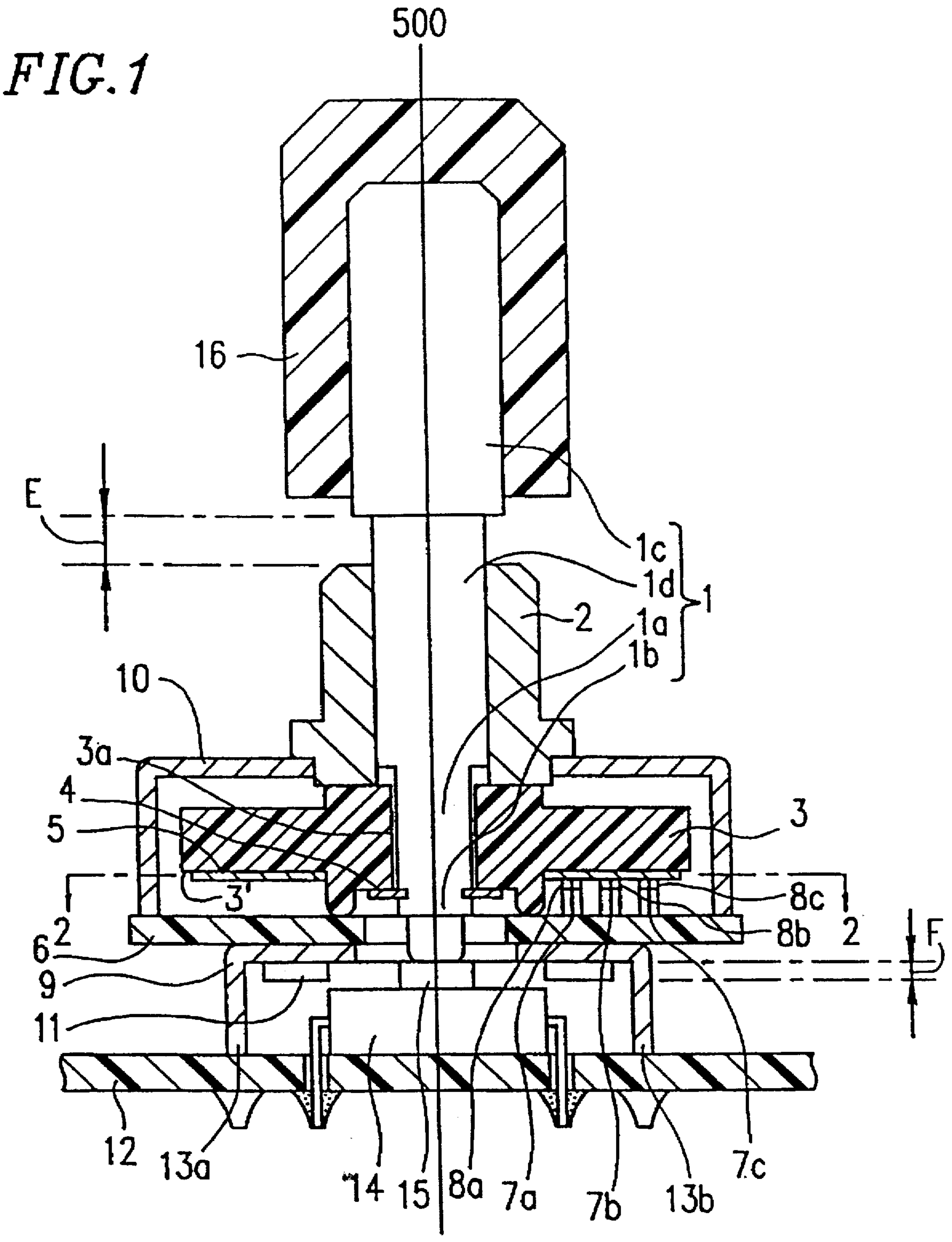
FIG. 1 is a front cross-sectional view showing a conventional rotary encoder.
Figure 2:
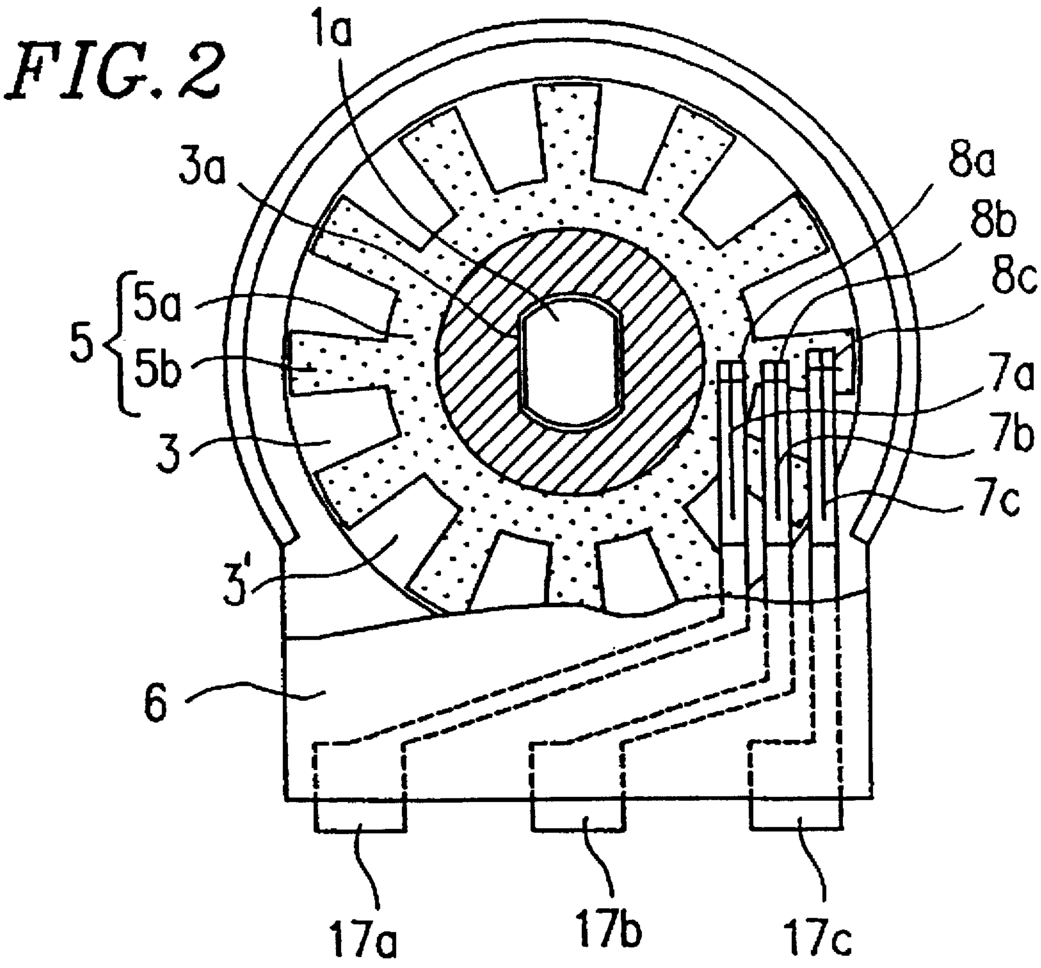
FIG. 2 is a cross-sectional view of the rotary encoder shown in FIG. 1 taken along a line 2—2.
Figure 3:
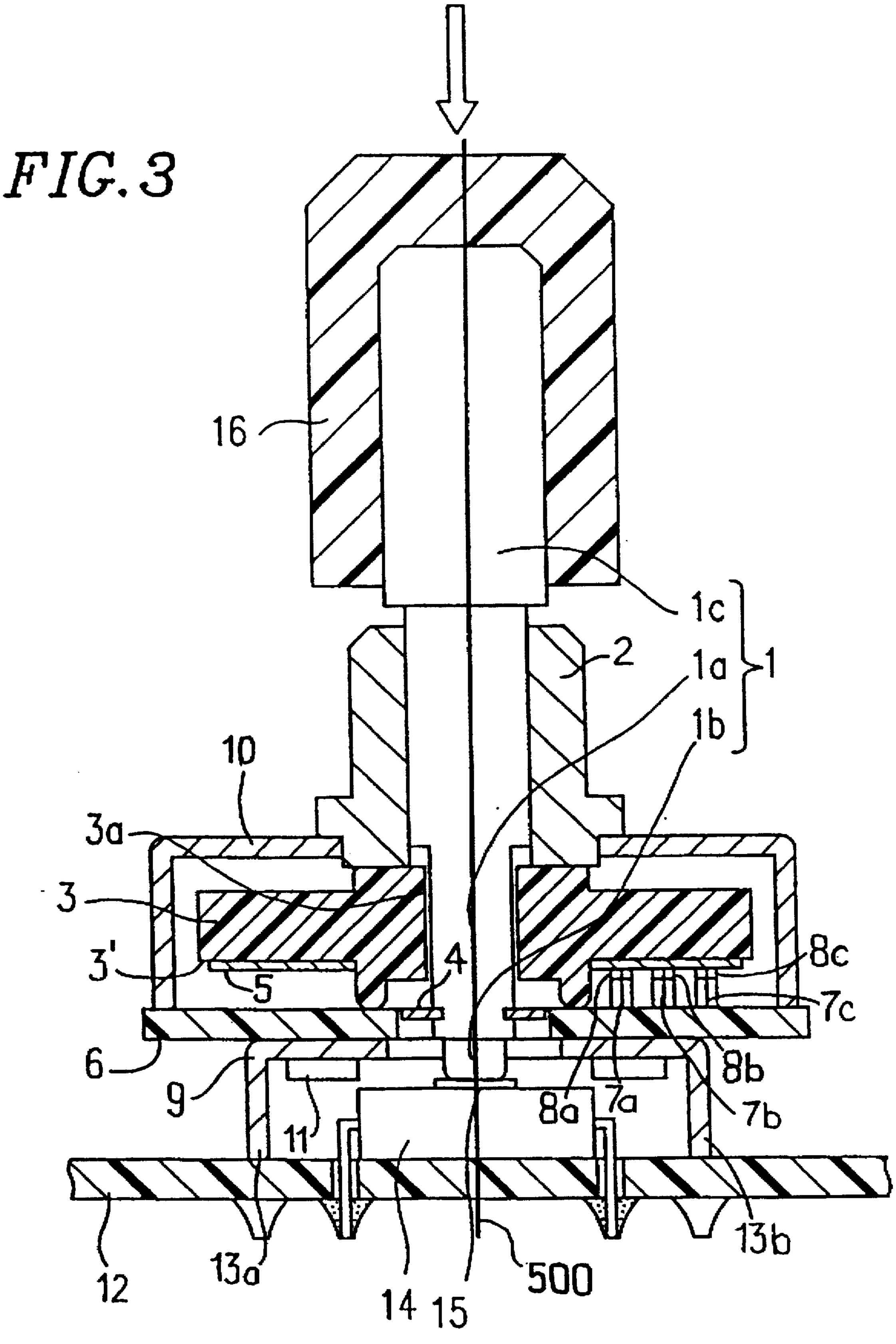
FIG. 3 shows the operation of a rotary shaft of the rotary encoder shown in FIG. 1 for pushing a push button.
Figure 4:
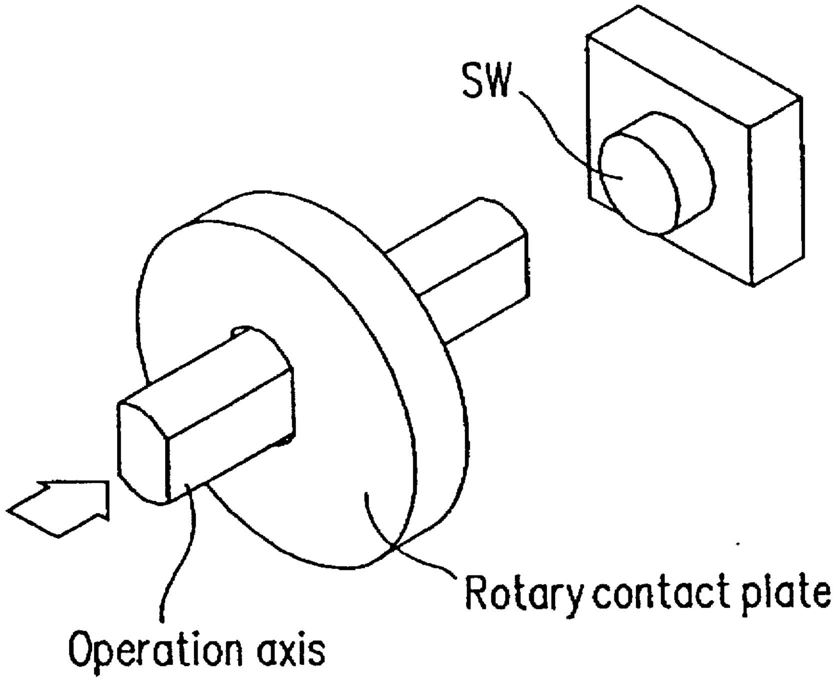
FIG. 4 shows that the rotary shaft of the rotary encoder shown in FIG. 1 engages with a rotary contact plate.
Figure 5:
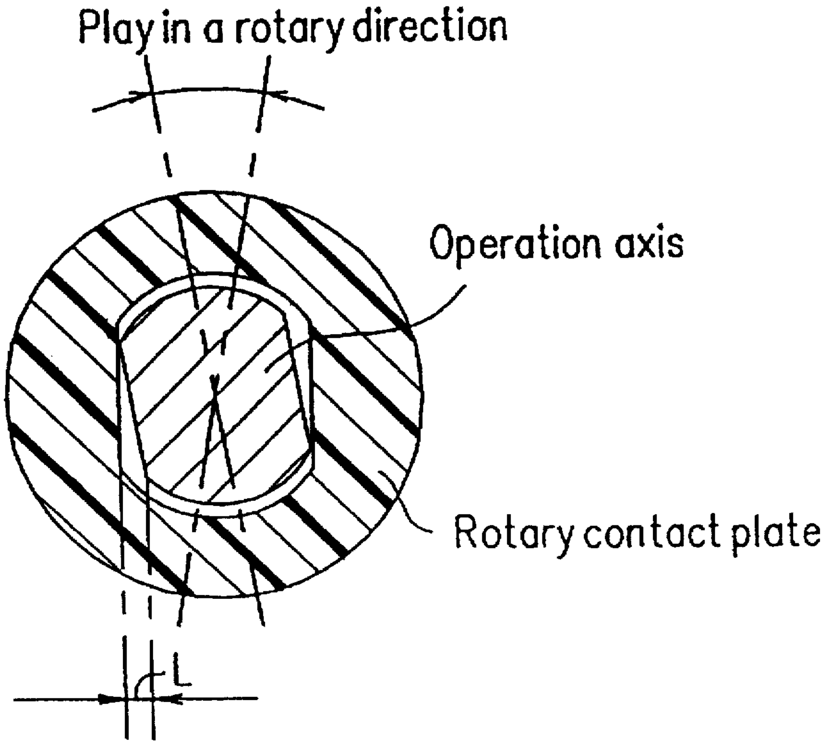
FIG. 5 shows that the rotary shaft of the rotary encoder shown in FIG. 1 engages with a rotary contact plate.
Figure 6:
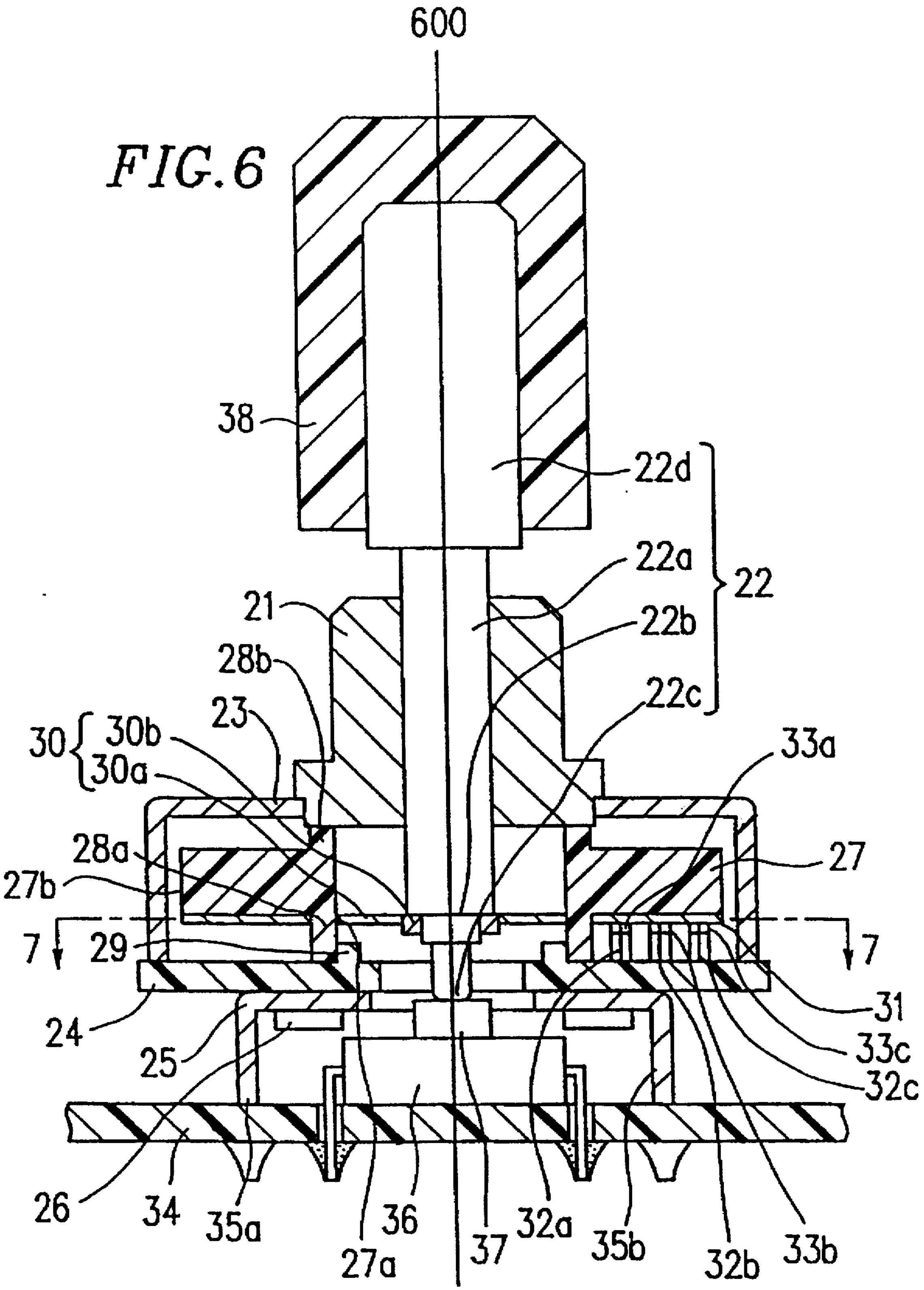
FIG. 6 is a front cross-sectional view showing an example of a rotary operation type electronic device according to the present invention.
Figure 7:
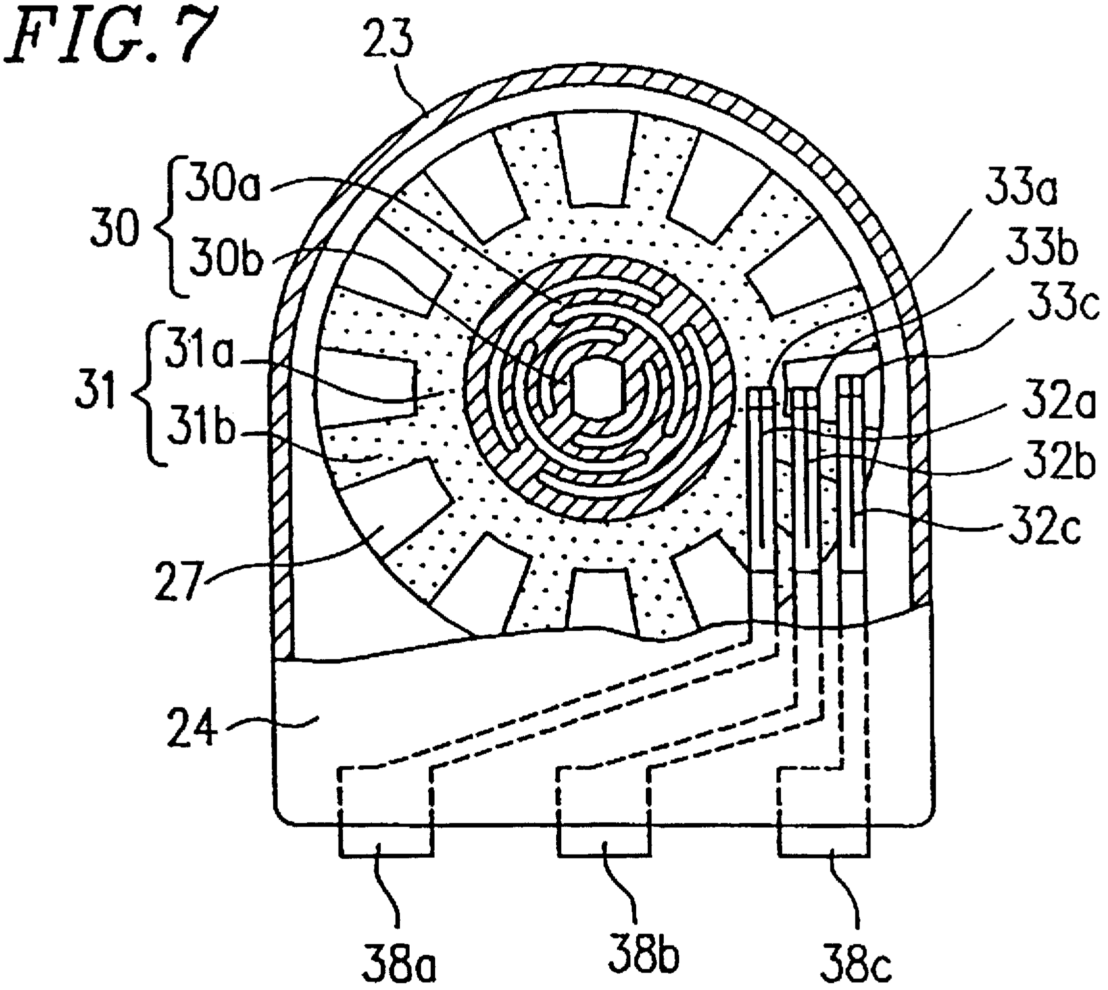
FIG. 7 is a cross-sectional view of a rotary operation type electronic device shown in FIG. 6 taken along a line 7—7.

FIG. 6 shows the rotary operation type electronic device according to Example 1. The rotary operation type electronic device according to Example 1 includes: a rotary shaft 22 capable of moving in an axial direction; a bushing 21 for holding the rotary shaft 22; a cover 23; a fixed substrate 24; and a rotary contact plate 27 having a donut-like shape including an inner circumference 27*a* and an outer circumference 27*b*.

When a user rotates a control 38 attached to the rotary shaft 22, the rotary contact plate 27 rotates with the rotary shaft 22. The rotary contact plate 27 is in contact with legs 32*a*, 32*b* and 32*c*. The legs 32*a*, 32*b* and 32*c* are connected to the fixed substrate 24. In the case where a signal, for example, a DC signal is transmitted from a terminal 38*a* of the fixed substrate 24, two signals obtained by sampling the transmitted signal are output from terminals 38*b* and 38*c* of the fixed substrate 24, respectively. The terminals 38*b* and 38*c* are electrically connected to the legs 32*b* and 32*c*, respectively. A rotation angle and/or a rotation speed of the rotary shaft 22 are calculated based on the two output signals from the terminals 38*b* and 38*c*. The legs 32*a*, 32*b*, and 32*c* may consist of elastic members.

Moreover, in the case where a push switch 36 is positioned directly below the rotary shaft 22, when the user pushes the control 38, a button 37 of the push switch 36 is pushed by the rotary shaft 22. By this operation, a current is made to flow through the push switch 36 or is interrupted from flowing. In other words, the push switch 36 becomes turned-on state or turned-off state in response to pushing the rotary shaft 22.

Hereinafter, the configuration of the rotary operation type electronic device will be described.

The rotary shaft 22 has a cylindrical part 22*a*, a connection part 22*b*, a bottom part 22*c* and a head part 2*d*. The control 38 is attached to the head part 22*d* of the rotary shaft 22. The cylindrical part 22*a* of the rotary shaft 22 is inserted into an inner hole of the bushing 21. The rotary shaft 22 is movable along the inner surface of the bushing 21 in an axial direction. When an outer diameter of the rotary shaft 22 is D mm, a diameter of the inner hole of the bushing 21 is greater than D mm and a slight gap is provided so that the rotary shaft 22 is rotatable and vertically movable in an axial direction. The connection part 22*b* of the rotary shaft 22 is connected to the rotary contact plate 27 by a connecting member 30. The push switch 36 is positioned below the rotary shaft 22. The bottom part 22*c* may be in contact with the button 37 of the push switch 36 before pushing the button 37. However, in the case where the bottom part 22*c* of the rotary shaft 22 can push the button 37 of the push switch 36 to change a state of the push switch 36, the bottom part 22*c* may be separated from the button 37 before pushing the button 37.

The push switch 36 is placed on, for example, a printed wiring substrate 34 of an apparatus using the rotary encoder. In this case, the fixed substrate 24 and the printed wiring substrate 34 are connected to each other by a fixture 25. The fixture 25 is connected to the fixed substrate 24 by a projection 26 of the cover 23. The printed wiring substrate 34 is connected to legs 35*a* and 35*b* of the fixture 25 by soldering. Although it is sufficient that the fixture 25 has one set of legs 35*a* and 35*b*, it is preferable that the fixture 25 has two or more sets of the legs 35*a* and 35*b*.

The rotary contact plate 27 is enclosed by the bushing 21, the cover 23 and the fixed substrate 24. The bushing 21, the cover 23 and the fixture 25 may be made of metal. The rotary contact plate 27 is placed outside the cylindrical part 22*a* of the rotary shaft 22 penetrating through the inner hole of the bushing 21. It is preferable that the central axes of the inner hole of the bushing 21, the cylindrical part 22*a* and the rotary contact plate 27 are identical with each other. Guide protrusions 29 are provided on the fixed substrate 24 so that the rotary axis of the rotary contact plate 27 is prevented from moving except as coincident with the rotary movement around the rotational axis 600. A hollow cylindrical portion 28*a* of the rotary contact plate 27 rotates along the guide protrusions 29.

Although the guide protrusions 29 are provided inside a hollow cylindrical portion 28*b* shown in FIG. 6, the guide protrusions 29 may be provided outside the hollow cylindrical portion 28*b*. Alternatively, guide protrusions may be provided on the cover 23 and/or the bushing 21. In this case, the guide protrusions may be provided inside and/or outside the hollow cylindrical portion 28*a* of the rotary control plate 27.

Hereinafter, the rotary contact plate 27, the legs 32*a*, 32*b* and 32*c* will be described in detail with reference to FIG. 7.

A conducting layer 31 having a ring portion 31*a* and a plurality of trapezoidal portions 31*b* extending from the ring portion 31*a* in a radial manner is formed on the rotary contact plate 27. The conducting layer 31 faces the fixed substrate 24. The legs 32*a*, 32*b* and 32*c* are fixed onto the fixed plate 24. A contact point 33*a* of the leg 32*a* is in contact with the ring portion 31*a*. Contact points 33*b* and 33*c* of the legs 32*b* and 32*c* are positioned so as to be capable of being in contact with the trapezoidal portions 31*b*. The contact portion 33*b*, the central point of the rotary contact plate 27 and the contact portion 33*c* are set so as to form an acute angle. By this configuration, in the case where a DC current is input to the terminal 38a electrically connected to the leg 32*a*, different signals are output from the terminals 38*b* and 38*c* electrically connected to the legs 32*b* and 32*c*, respectively.

The rotary contact plate 27 is connected to the connecting member 30. The connecting member 30 may be made of metals such as phosphor bronze, brass and stainless or hard rubber. In the case where a thin metal plate such as phosphor bronze, brass, stainless is used for the connecting member 30, the connecting member 30 is formed by boring the thin plate and processing it.

The connecting member 30 may be integrally formed with the rotary contact plate 27. In this case, the connecting member 30 and the rotary contact plate 27 may be made of insulating resin. The connecting member 30 and the rotary shaft 22 are connected to each other in a fixed manner. As a method for fixing the connecting member 30 and the rotary shaft 22, the connecting member 30 may be sandwiched between the connection part 22*b* of the rotary shaft 22 and a washer, so that the washer does not slip out of the connection portion. Furthermore, by using glue, the connecting member 30 may be fixed to the rotary shaft 22.

It is sufficient that the connecting member 30 has such a configuration that the connecting member 30 extends and retracts in the axial direction of the rotary shaft 22. However, the connecting member 30 does not vary structurally in a rotational direction of the rotary shaft 22. In other words, the connecting member 30 is not displaced in a rotational direction of the rotary shaft 22. A rotational axis 600 passes through the center of the rotary shaft 22. The rotary shaft 22 rotates about the rotational axis 600. By the abovementioned configuration, the rotary shaft 22 and the rotary contact plate 27 independently move within a certain range (referred to as E) in the axial direction. However, the rotary shaft 22 and the rotary contact plate 27 integrally move in the rotational direction. Specifically, the rotary shaft 22 moves with the rotary contact plate 27 substantially without any "play" or "slop".

An embodiment of the connecting member 30 having a gimbal structure which is one of the structures will be described with reference to FIG. 8.

A hole 100 is formed through the center of the connecting member 30, in which the connection part 22*c* is to be inserted. The hole 100 may have any shape as long as the connecting member 30 can be fixed with the connection part 22*b*. A plurality of holes extending along concentric circles are formed on the concentric circles of the connecting member 30. The plurality of holes are classified into a plurality of groups. Holes belonging to one are formed on a concentric circle. Each of the plurality of groups is formed on a different concentric circle.

In other words, the connecting member 30 has a plurality of rings having different sizes on the respective concentric circles and a plurality of connecting portions for connecting the adjacent rings.

Figure 8:
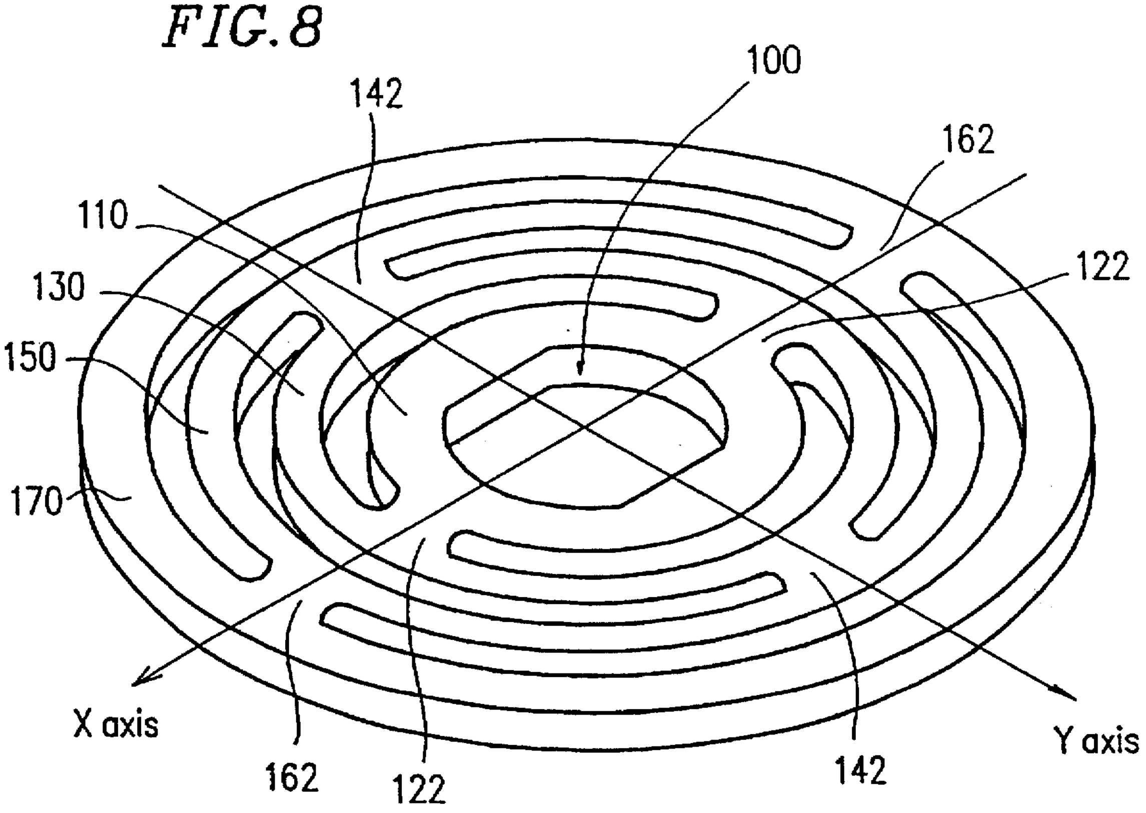
FIG. 8 shows an example of a connecting member of a rotary operation type electronic device according to the present invention.

For example, as shown in FIG. 8, the connecting member 30 includes first to fourth rings 110, 130, 150 and 170, which have increasing sizes in this order, and connecting portions 122, 142 and 162.

The first ring 110 and the second ring 130 are connected through the connecting portions 122 positioned in an X axis direction. The second ring 130 and the third ring 150 are connected through the connecting portions 142 positioned in a Y axis direction. Furthermore, the third ring 150 and the fourth ring 170 are connected to each other through the connecting portions 162 positioned in the X direction. The second ring 130 and the third ring 150 are not connected through connecting portions positioned in the X axis direction. Specifically, the rings are connected to every other connecting portion in one direction, for example, the X axis direction and the Y axis direction. In the connecting member shown in FIG. 8, the X axis direction perpendicularly crosses the Y direction. In the case where the number of directions in which connecting portions are placed is two or more, it is preferred that angles formed by crossing lines extending in the respective directions are substantially identical with each other.

FIGS. 9A and 9B shows an example of another connecting member having the gimbal structure.

FIG. 9A is a front view of a connecting member 200. FIG. 9B is a cross-sectional view taken along a line 8B shown in FIG. 9A. The connecting member 200 shown in FIGS. 9A and 9B differs from the connecting member 30 shown in FIG. 8 in that the connecting member 200 is not planar. The connecting member 200 has rings in different planes such that connecting portions 210, 220 and 230 respectively have a height. A height of the connecting portions 230 between the ring closest to the hole and the adjacent ring thereto is greater than those of the connecting portions 210 and 220. Moreover, only the ring closest to the hole 240 may be higher than the other rings.

Hereinafter, the operation of a rotary operation type electronic device according to Example 1 will be described.

Referring again to FIGS. 6 and 7, the user rotates the control 38 attached to the head part 27*d* of the rotary shaft 22. Then, the rotary shaft 22 rotates followed by the rotation of the connecting member 30. The rotary contact plate 27, which is fit to the outer periphery of the connecting member 30 rotates, thereby rotating the conductor layer 31 formed on the rotary contact plate 27. The contact points 33*a*, 33*b* and 33*c* of the legs 32*a*, 32*b* and 32*c* slide in contact with the conductor layer 31. When a DC signal (alternatively, an AC signal) is applied to the terminal 38*a* of the leg 32*a*, different pulse signals are output from the terminals 38*b* and 38*c* of the legs 32*b* and 32*c*, respectively, because the positions of the contact points 33*b* and 33*c* in contact with the trapezoidal portions 31*b* of the conducting layer 31 are deviated. It is possible to generate pulse signals which are different only in phase by giving a certain shape to trapezoidal portions 31*b* of the conducting layer 31. Since the two pulse signals output from the terminals 38*b* and 38*c* are obtained, the rotary operation type electronic device functions as an encoder.

In the case where the control 38 of the rotary operation type electronic device according to Example 1 is rotated, the rotary shaft 22 does not move in an axial direction. Therefore, a user cannot change the state of the push switch.

Figure 10:
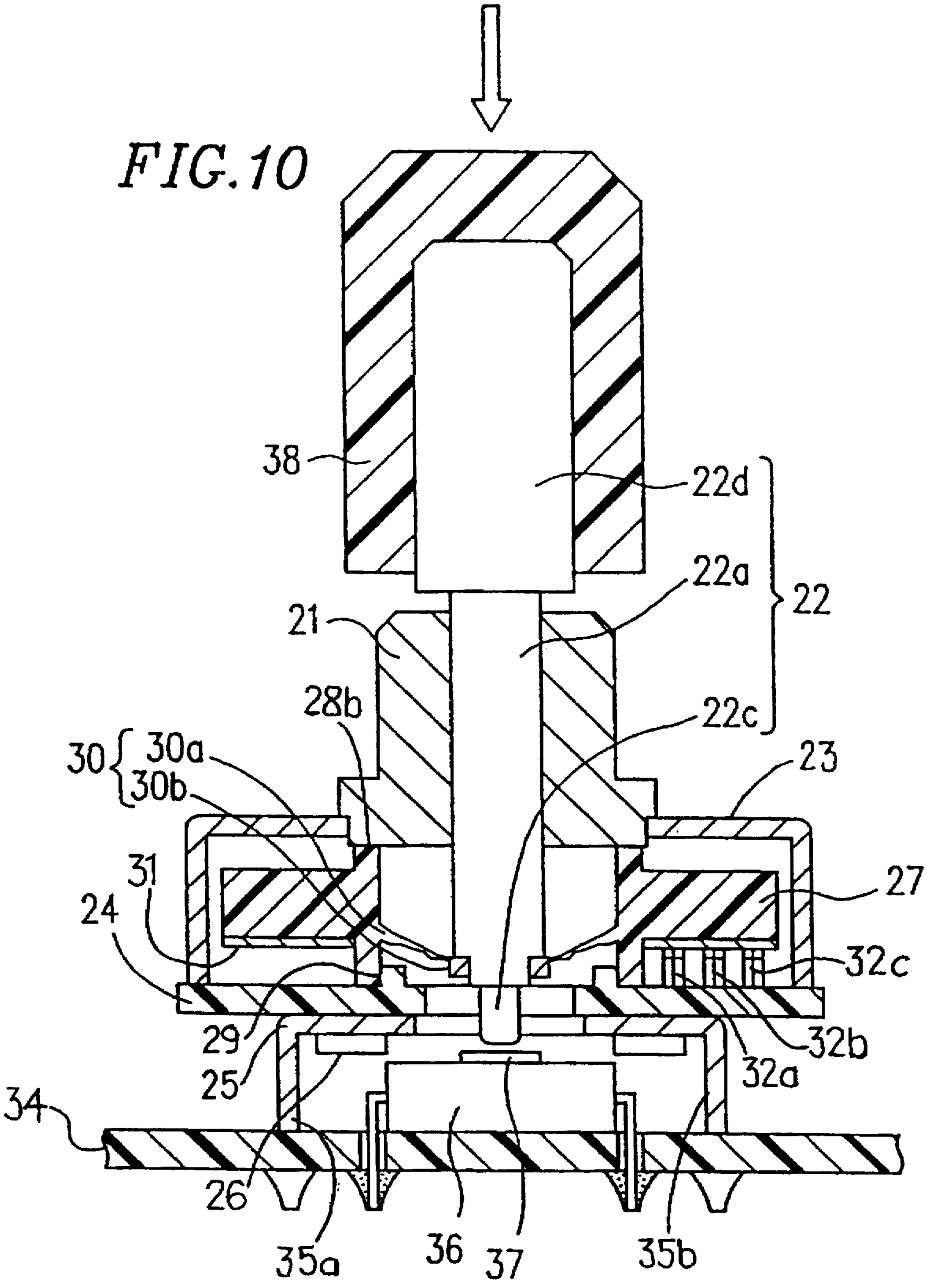
FIG. 10 shadows the operation of the rotary operation type electronic device shown in FIG. 6 for pushing a push button.

The operation of the rotary operation type electronic device according to Example 1 upon pushing the control 38 will be described with reference to FIG. 10.

A user moves the rotary shaft 22 in a direction indicated with an arrow by pushing the control 38. The rotary shaft 22 moves in a direction of the push switch 36 by a stroke (F), whereby a bottom part 22*c* of the rotary shaft 22 pushes the button 37 of the push switch 36. When the button 37 is pushed, the state of the push switch 36 is changed. For example, when the button 37 of the push switch 36 is pushed while the push switch 36 is in a turned-on state, the push switch 36 is changed to a turned-off state. When the button 37 is pushed while the push switch 36 is in a turn-off state, the push switch 36 is changed to a turned-on state. The degree of stroke(F) of the push switch 36 is smaller than the range (E) where the rotary shaft 22 can moves in an axial direction of the rotary shaft 22.

Although the rotary contact plate 27 is connected to the rotary shaft 22 through the connecting member 30, the rotary contact plate 27 does not move with the rotary shaft 22 since the rotary contact plate 27 is supported by the fixed substrate 24. This is because a plurality of narrow rings 30*a* are deflected to vertically extend, thereby absorbing the translation of the rotary shaft 22. Therefore, the encoder section including the rotary contact plate 27 is not affected by the movement of the rotary shaft 22 in an axial direction.

When the user stops pushing the control 38, the rotary shaft 22 and the control 38 return to their original positions. The original positions indicate the positions where the rotary shaft 22 and the control 38 are positioned before the user pushes the control 38.

Example 2

Figure 11:
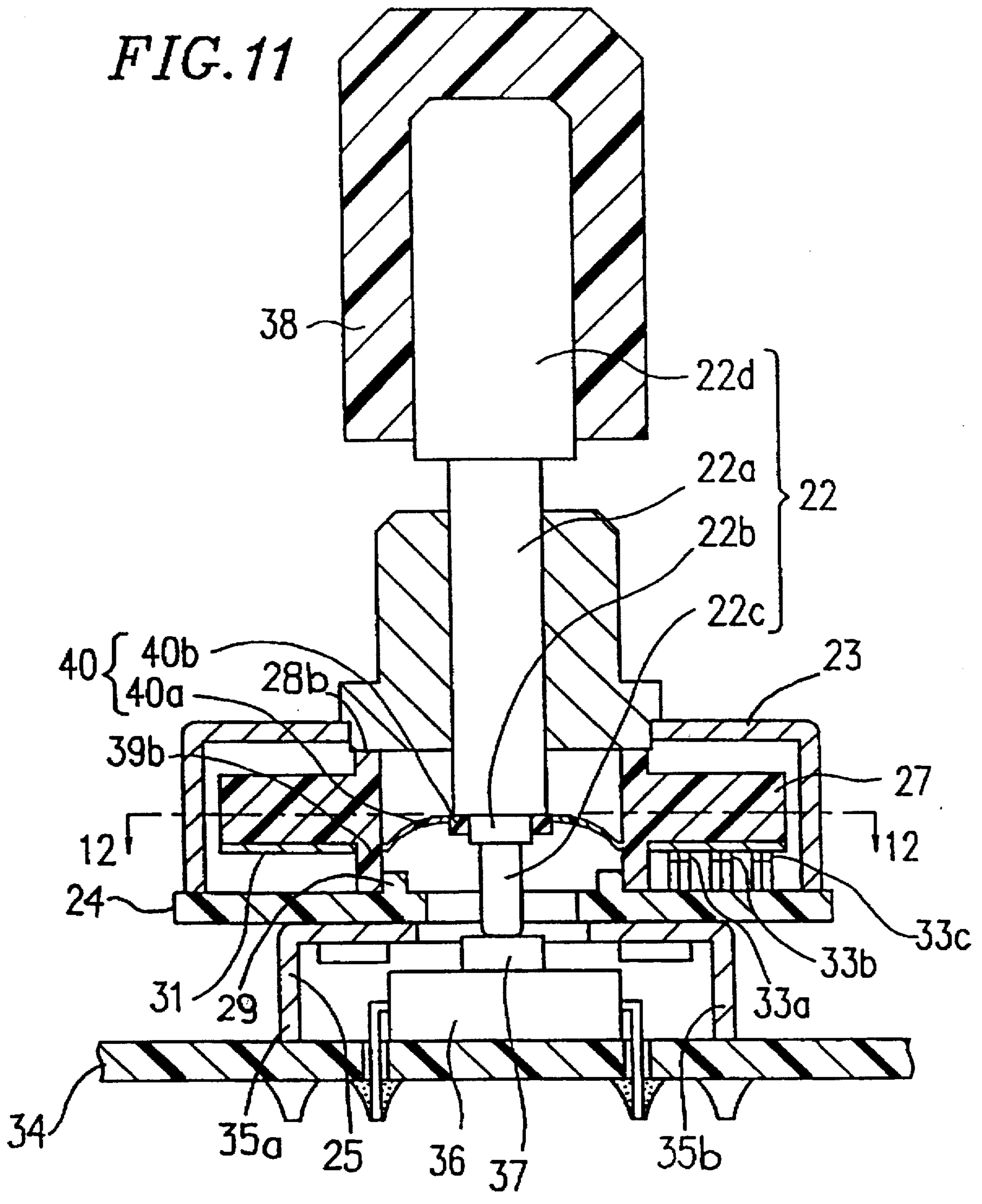
FIG. 11 is front cross-sectional view showing an example of a rotary operation type electronic device according to the present invention.
Figure 12:
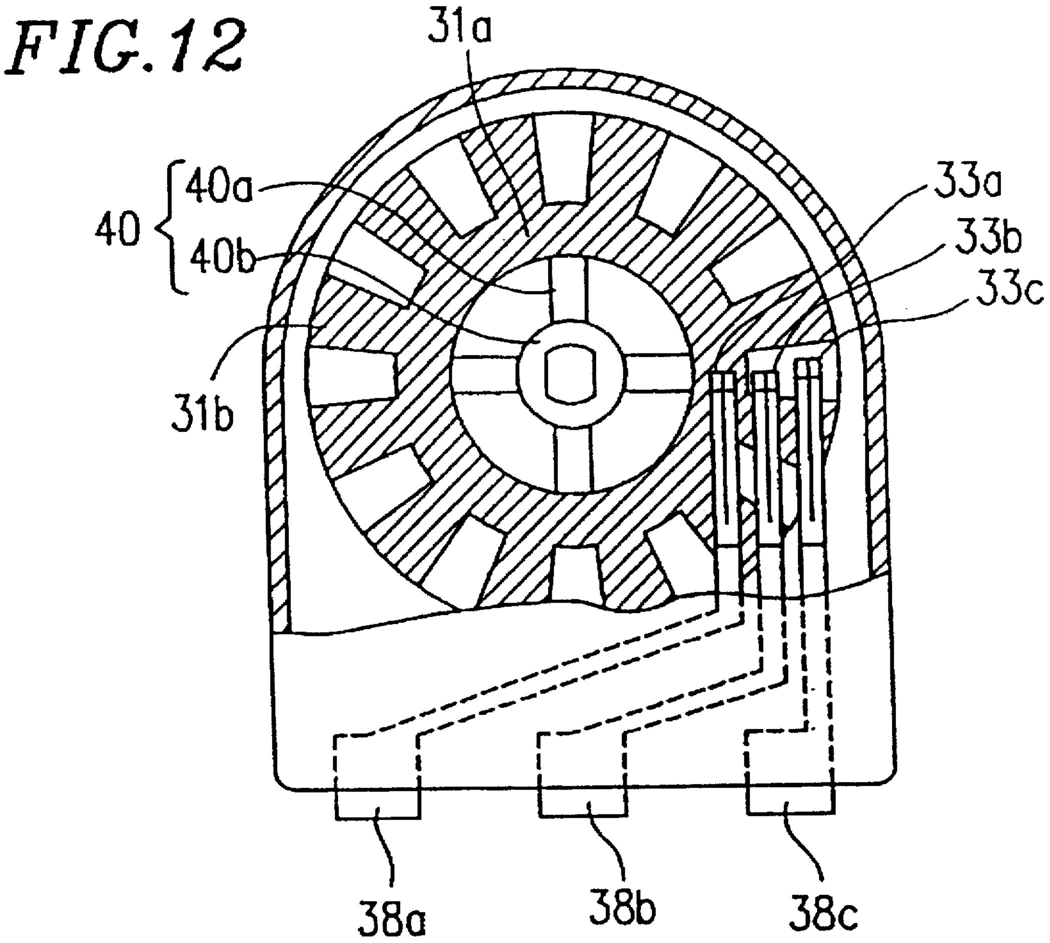
FIG. 12 a cross-sectional view showing a rotary operation type electronic device shown in FIG. 11 taken along a line 12—12.
Figure 13:
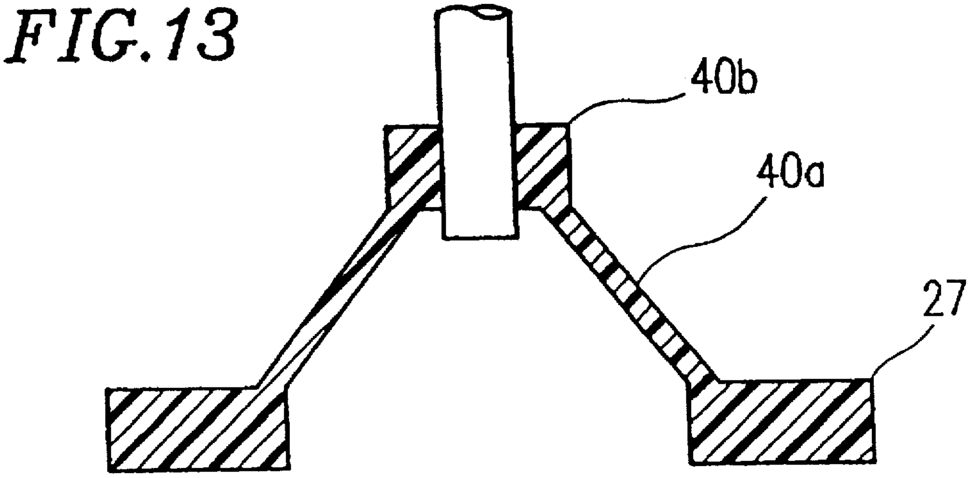
FIG. 13 shows the connecting member shown in FIG. 11 in detail.

Hereinafter, a second example of a rotary operation type electronic device according to the present invention will be described with reference to FIGS. 11, 12 and 13. Since the same components as those of the rotary operation type electronic device according to Example 1 are denoted by the same reference numerals, the description thereof is omitted.

The rotary operation type electronic device according to Example 2 differs from that according to Example 1 in the configuration of a connecting member for connecting the rotary shaft and the rotary contact plate.

Hereinafter, a connecting member 40 according to Example 2 will be described.

The rotary contact plate 27 is connected through the connecting member 40 and a plurality of connecting portions 40*a*. The connecting portions 40*a* are curved so as to connect the rotary contact plate 27 and the connecting member 40. Specifically, The connecting portions 40*a* are convex in a direction opposite to the direction in which the push switch 36 is positioned. Although a thickness and a width of the connecting portions 40*a* change depending on the material used for the connecting portions 40*a*, the thickness and the width are determined in view of operation conditions of the rotary shaft 22 and the rotary contact plate 27. The number of the connecting portions 40*a* shown in FIG. 12 is four. In the case where the number of connecting portions 40*a* is n, angles between the adjacent connecting portions 40*a* are 360/n degree each. Specifically, it is preferable that angles between the adjacent connecting portions 40*a* are substantially identical with each other.

The connecting member 40 may be made of metals such as phosphor bronze, brass and stainless or hard rubber. In the case where a thin metal plate such as phosphor bronze, brass, stainless is used for the connecting member 40, the connecting member 40 is formed by boring the thin plate and processing it.

The rotary contact plate 27 and the connecting member 40 including the connecting portions 40*a* may be integrally formed. In this case, it is preferred that the rotary contact plate 27 and the connecting member 40 including the connecting portions 40*a* are made of insulating resin.

In the case where the control 38 attached onto the head part 22*d* of the rotary shaft 22 is rotated and a signal is provided to the terminal 38*a*, pulse signals are output from the terminals 38*b* and 38*c*, respectively, as in Example 1.

Hereinafter, the operation for pushing the control 38 of the rotary operation type electronic device according to Example 2 will be described with reference to FIG. 14.

Figure 14:
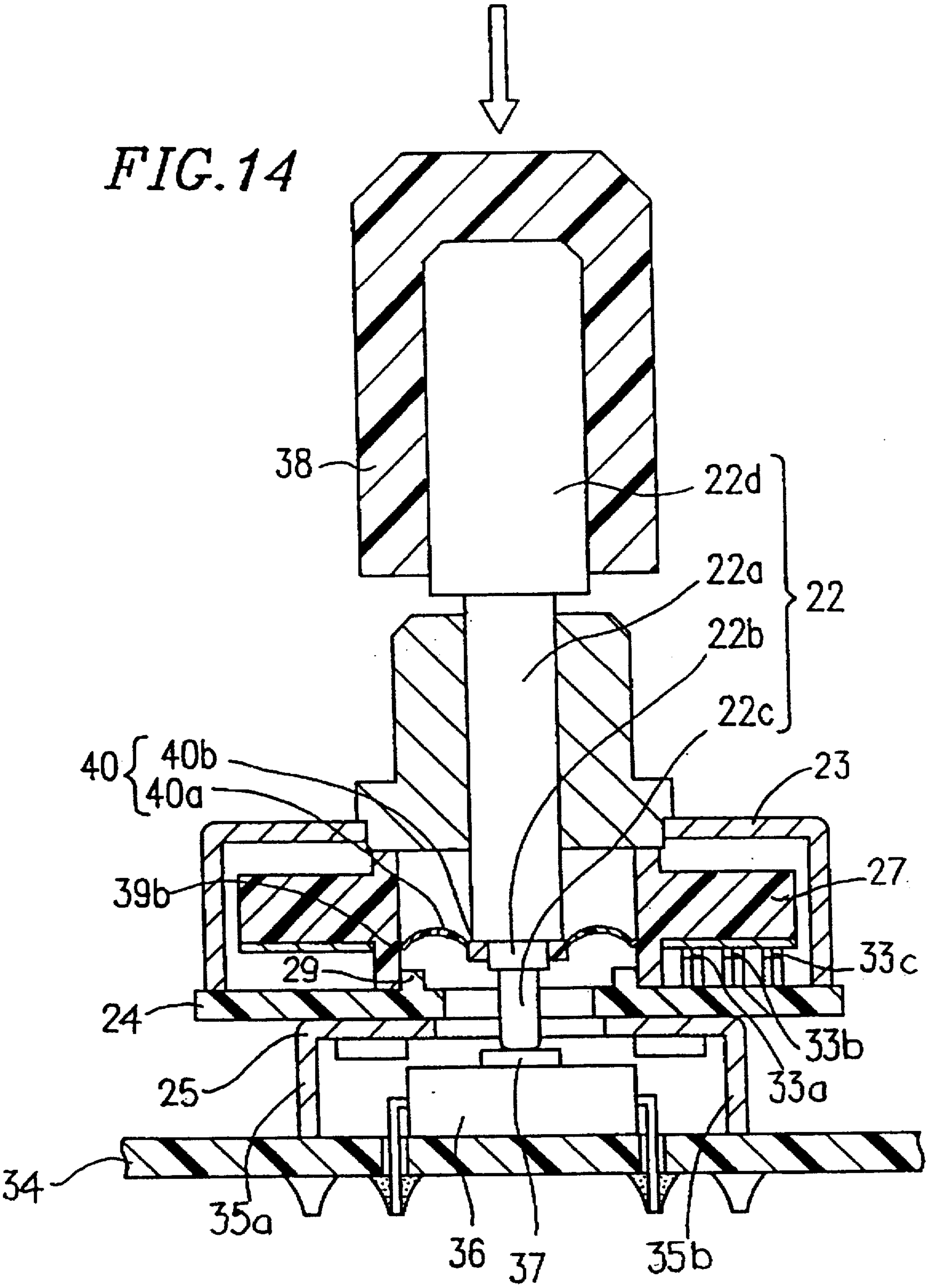
FIG. 14 shows the operation of the rotary operation type electronic device shown in FIG. 11 for pushing a push button.

The user moves the rotary shaft 22 in a direction indicated with an arrow shown in FIG. 14 by applying force on the control 38. The rotary shaft 22 moves in a direction of the push switch 36 by a stroke (F), a bottom part 22*c* of the rotary shaft 22 pushes the button 37 of the push switch 36. If the button 37 is pushed, the state of the push switch 36 is switched.

In order to switch the state of the push switch 36, it is preferred that the connecting portions 40*a* satisfy either of the following conditions 1 or 2.

1. The connecting portions 40*a* have a space which is required to move the rotary shaft 22 in an axial direction by a stroke (F) of the push switch 36.

2. As shown in FIG. 13, a position of a central portion 40*b* of the connecting member 40 increases from a position of the rotary contact plate 27 before pushing the button by the stroke (F) of the push switch 36.

Example 3

Figure 15:
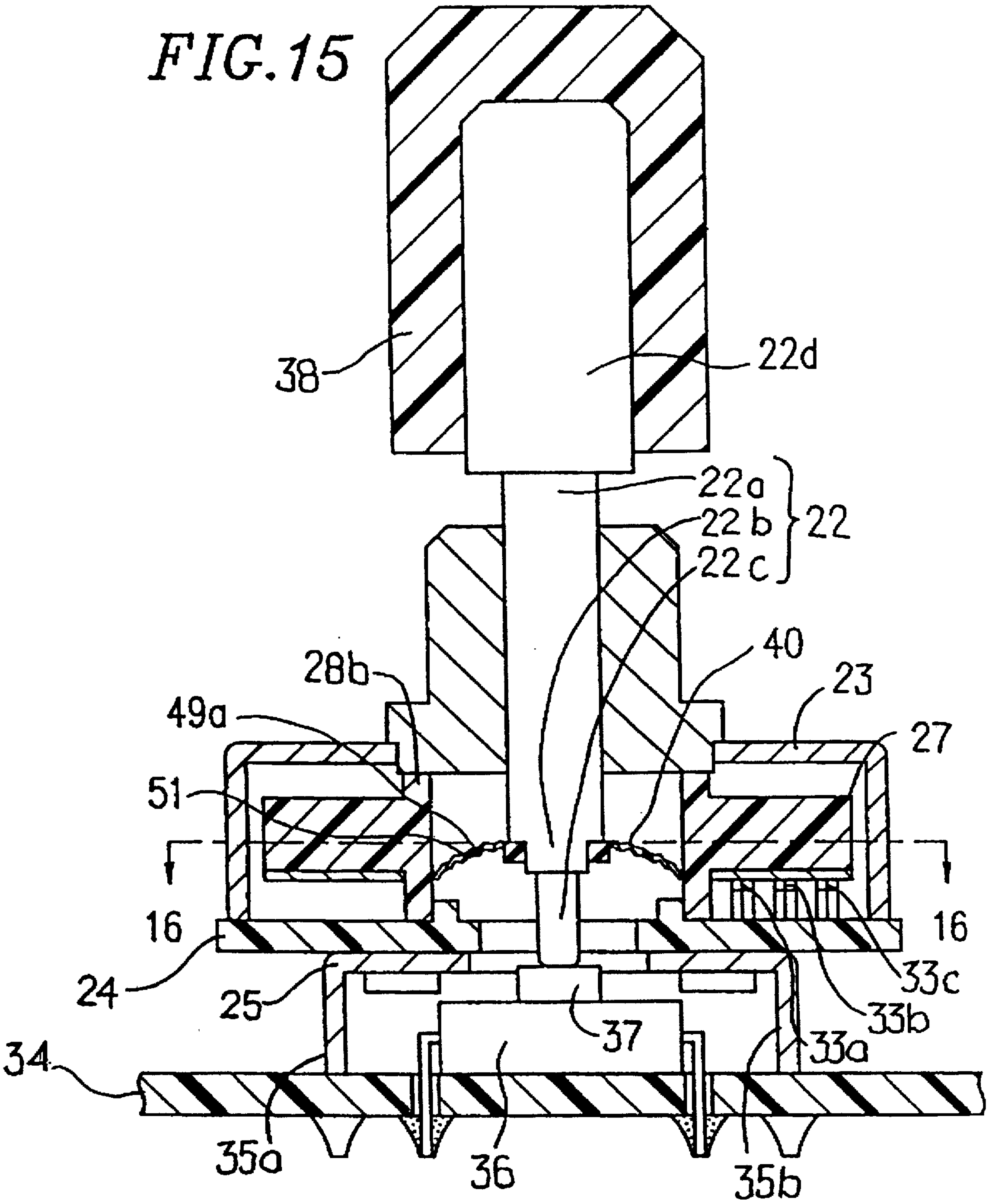
FIG. 15 is a front cross-sectional view showing an example of a rotary operation type electronic device according to the present invention.
Figure 16:
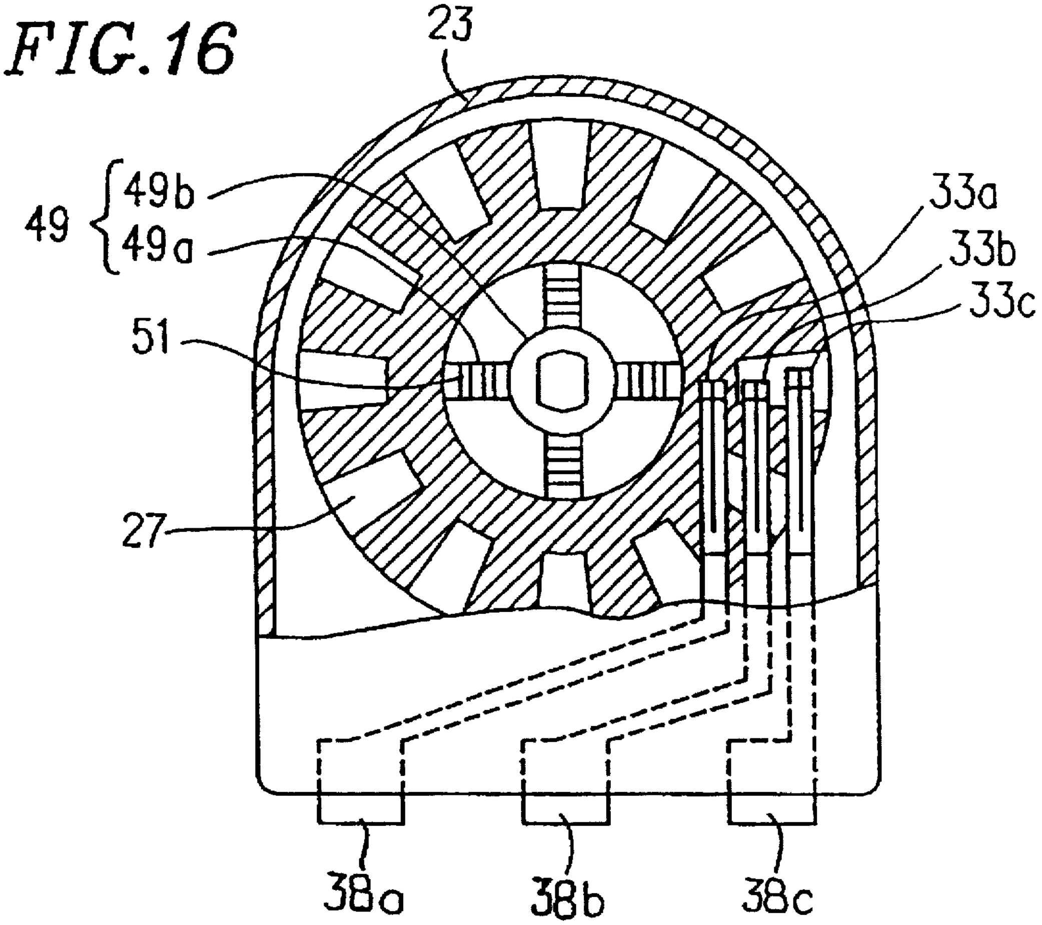
FIG. 16 is a cross-sectional view of the rotary operation type electronic device shown in FIG. 15 taken along a line 16—16.
Figure 17:
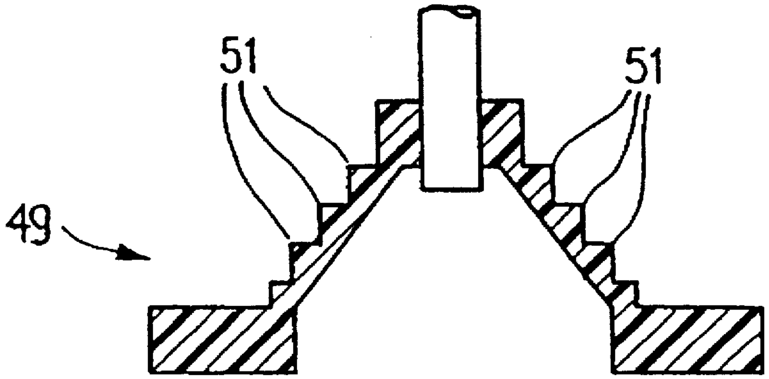
FIG. 17 shows the connecting member shown in FIG. 15 in detail.

Hereinafter, a third example of the rotary operation type electronic device according to the present invention will be described with reference to FIGS. 15, 16 and 17. Since the same components as those of the rotary operation type electronic device according to Example 2 are denoted by the same reference numerals, the description thereof is omitted.

A rotary operation type electronic device according to Example 3 differs from that according to Example 2 in the configuration of a connecting member for connecting the rotary shaft and the rotary contact plate.

Specifically, ribs 51 are provided for the connecting portions 40*a* according to Example 2 in Example 3. Connecting portions 49*a* according to Example 3 respectively have the ribs 51 in a tangential direction with respect to the rotation of the rotary shaft 22 (FIG. 17).

Since the connecting portions 49*a* respectively have the ribs 51, a crookedness of the connecting member 49 for connecting the rotary shaft 22 and the rotary contact plate 27 can be reduced even when a rotation torque of the rotary contact plate 27 (encoder section) is large.

The rotary contact plate 27 and the connecting member 49 including the connecting portions 49*a* and a central portion 49*b* may be integrally formed. In this case, it is preferred that the rotary contact plate 27 and the connecting member 49 are made of insulating resin.

The connecting member 49 may be made of metals such as phosphor bronze, brass and stainless or hard rubber. In the case where a thin metal plate such as phosphor bronze, brass, stainless is used for the connecting member 49, the connecting member 49 is formed by boring the thin plate and processing it.

Figure 18:
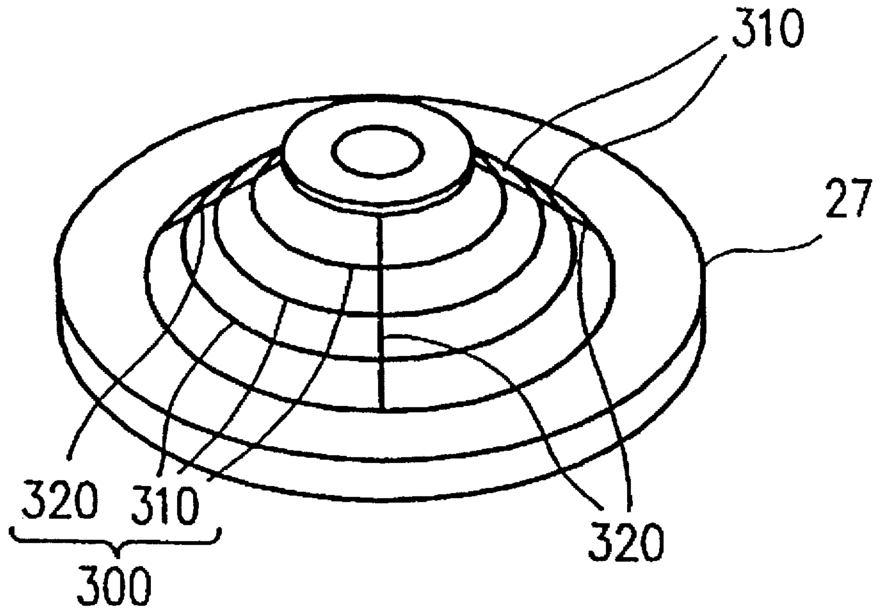
FIG. 18 shows an example of a connecting member of a rotary operation type electronic device according to the present invention.

As described above, the connecting member may have the configuration as shown in FIG. 18 if the connecting member extends and retracts in an axial direction of the rotary shaft 22 and does not extend and contract in a rotational direction of the rotary shaft 22. The connecting member 300 has a plurality of rings 310 having an inner circumference and an outer circumference different from each other and a plurality of elastic members 320 for connecting the respective rings 310 to each other. The elastic members 320 are placed so that the distances therebetween are equal to each other. The connecting member 300 may be made of metals such as phosphor bronze, brass and stainless or hard rubber. In the case where a thin metal plate such as phosphor bronze, brass, stainless is used for the connecting member 300, the connecting member 300 is formed by boring the thin plate and processing it.

The rotary contact plate 27, a plurality of rings 310 and a plurality of elastic members 320 may be integrally formed. In this case, it is preferred that the rotary contact plate 27, the plurality of rings 310 and the plurality of elastic members 320 are made of insulating resin.

Examples relating to a contact point type encoder in which three legs slide on a conductive layer of a rotary contact plate are described above. It is possible to apply the structure of the connecting member for connecting the rotary shaft 22 and the rotary contact plate 27 to a non-contact type encoder.

Figure 19B:
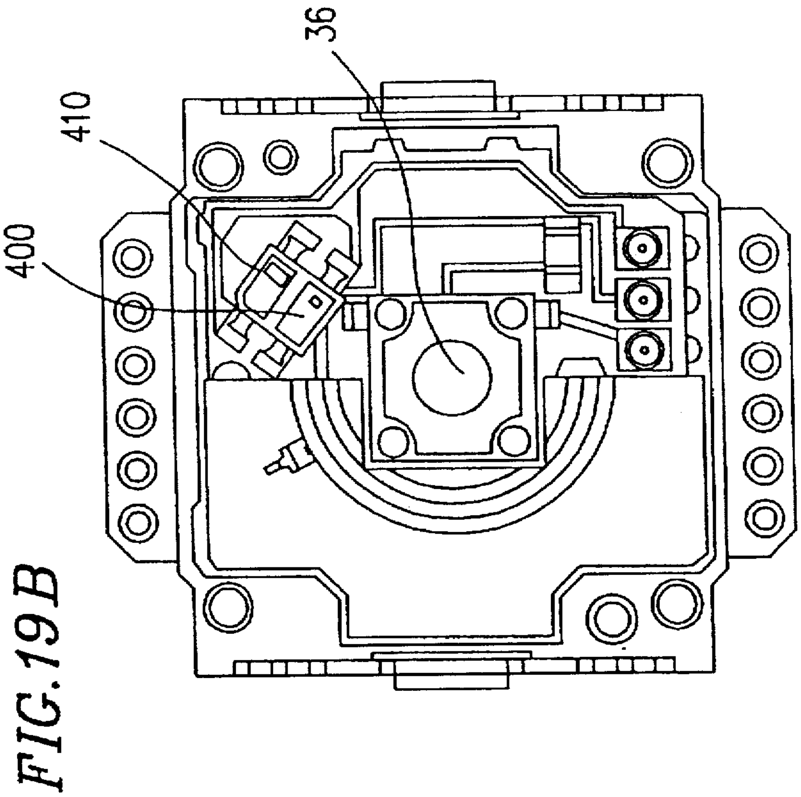
FIGS. 19A and 19B are front cross-sectional views showing an example of an optical encoder according to the present invention.
Figure 19A:
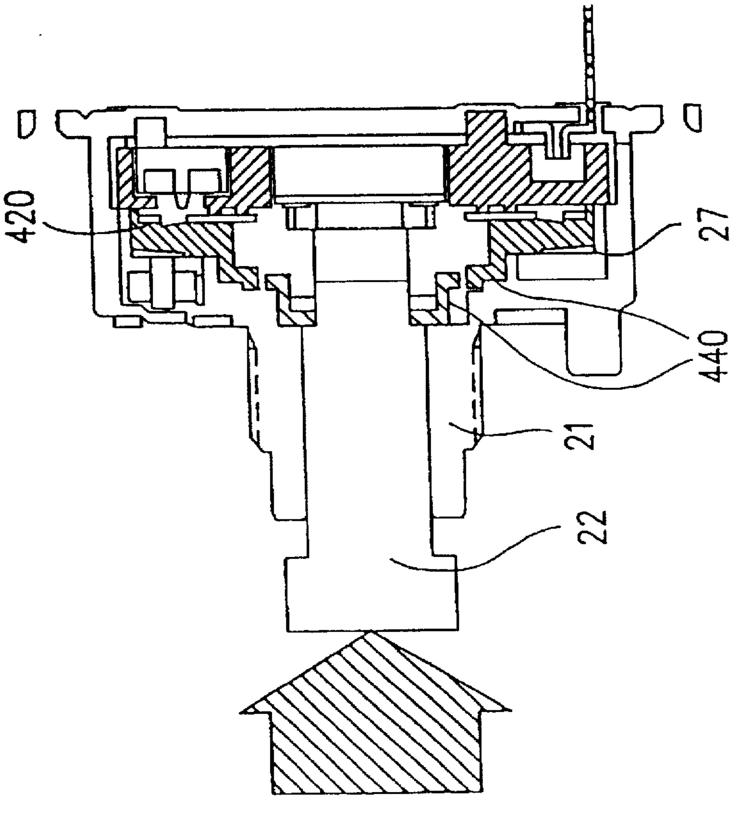

FIGS. 19A and 19B show a non-contact type optical encoder according to the present invention. Since the same components as those of the rotary operation type electronic device according to Example 1 are denoted by the same reference numerals, the description thereof is herein omitted. The difference between the non-contact type optical encoder and the rotary operation type encoder according to Example 1 will be described below.

In Example 1, the conductor layer with which three legs slide is formed on the rotary contact plate 27. On the other hand, the non-contact type optical encoder according to the present invention includes a mirror 420 instead of the conductor layer formed on the rotary contact plate 27, a phototransistor 400 and a photosensor 410 instead of three legs. The connecting member as described above may be used as long as the connecting member 440 for connecting the rotary shaft 22 and the rotary contact plate 27 extends and contracts in an axial direction of the rotary shaft 22 and does not extend and contract in a rotational direction of the rotary shaft 22.

Therefore, similar to the examples described above, the encoder section including the rotary contact plate 27 is not affected by the movement in the axial direction of the rotary shaft 22. The connecting member as described above may be applied to a non-contact type magnetic encoder.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A rotary operation type electronic device comprising:

a rotary shaft;

a rotary plate which is rotatable around a rotational axis;

connection means for connecting the rotary shaft and the rotary plate which, as a result of movement of the rotary shaft in an axial direction, retracts in an axial direction of the rotary shaft and does not retract in a rotary direction of the rotary plate; and output means, operatively coupled to the rotary plate, for outputting a signal in accordance with rotation of the rotary plate as a result of rotation of the rotary shaft, wherein the rotary plate has a donut-like shade including an inner circumference add an outer circumference, and the connection means is connected along the inner circumference of the rotary plate having the donut-like shade.

2. A rotary operation type electronic device according to claim 1, further comprising bushing means having an inner hole into which the rotary shaft is inserted, which allows the rotary shaft to rotate and to move in the axial direction.

3. A rotary operation type electronic device according to claim 1, wherein the connection means is integrally formed with the rotary plate.

4. A rotary operation type electronic device according to claim 1, wherein the connection means and the rotary plate are made of resin.

5. A rotary operation type electronic device according to claim 1, further comprising a push switch which is switched between ON and OFF in response to movement of the rotary shaft in the axial direction.

6. A rotary operation type electronic device according to claim 1, further comprising a push switch which is positioned on the rotary shaft and is switched between ON and OFF in response to movement of the rotary shaft in a direction in which the push switch is positioned.

7. A rotary operation type electronic device according to claim 1, wherein the connection means has a plurality of rings each being connected to adjacent rings, and the connection means has a gimbal structure.

8. A rotary operation type electronic device comprising:

a rotary shaft;

a rotary plate which is rotatable around a rotational axis;

connection means for connecting the rotary shaft and the rotary plate which, as a result of movement of the rotary shaft in an axial direction retracts in an axial direction of the rotary shaft and does not retract in a rotary direction of the rotary plate; and output means, operatively coupled to the rotary plate, for outputting a signal in accordance with rotation of the rotary plate as a result of rotation of the rotary shaft, wherein the connection means has a plurality of rings and a plurality of connecting portions for connecting adjacent rings, and the plurality of rings are placed on concentric circles having respectively different radiuses.

9. A rotary operation type electronic device comprising:

a rotary shaft;

a rotary plate which is rotatable around a rotational axis;

connection means for connecting the rotary shaft and the rotary plate which, as a result of movement of the rotary shaft in an axial direction, retracts in an axial direction of the rotary shaft and does not retract in a rotary direction of the rotary plate; and output means, operatively coupled to the rotary plate, for outputting a signal in accordance with rotation of the rotary plate as a result of rotation of the rotary shaft, wherein the connection means has a plurality of members which are convexly bendable in the axial direction, each of the plurality of bendable members have an end connected to the rotary plate and the other end connected to the rotary shaft.

10. A rotary operation type electronic device according to claim 9, wherein each of the bendable members has a rib in a tangential direction of the rotary shaft.

11. A rotary operation type electronic device comprising:

a rotary shaft;

a rotary plate which is rotatable around a rotational axis;

connecting means embracing the rotary shaft and extending between the rotary shaft and the rotary plate permitting relative axial movement between the rotary shaft and the rotary plate while precluding relative rotation; and output means, operatively coupled to the rotary plate, for outputting a signal in accordance with rotation of the rotary plate as a result of rotation of the rotary shaft, wherein the rotary plate has a donut-like shape including an inner circumference and an outer circumference, and the connecting means is connected along the inner circumference of the rotary plate having the donut-like shape.

12. A rotary operation type electronic device according to claim 11, wherein the connecting means is yieldable in an axial direction.

13. A rotary operation type electronic device according to claim 11, wherein the connecting means varies in axial yieldability radially and is most yieldable where it embraces the shaft.

* * * * *